United States Patent [19]

Hluchyj et al.

[11] Patent Number: 5,432,790
[45] Date of Patent: Jul. 11, 1995

[54] METHOD FOR ALLOCATING INTERNODAL LINK BANDWIDTH IN A PACKET ORIENTED COMMUNICATION NETWORK TO GUARANTEE DELAY QUALITY-OF-SERVICE

[75] Inventors: Michael G. Hluchyj, Wellesley; Amit Bhargava, Watertown; Pierre A. Humblet, Cambridge, all of Mass.

[73] Assignee: Motorola, Inc., Schaumburg, Ill.

[21] Appl. No.: 123,457

[22] Filed: Sep. 17, 1993

[51] Int. Cl.⁶ .............................................. H04J 3/16
[52] U.S. Cl. .................................. 370/95.1; 370/94.1
[58] Field of Search ................... 370/95.1, 94.1, 94.2, 370/60, 60.1, 95.3, 58.1, 58.2

[56] References Cited

U.S. PATENT DOCUMENTS

| | | | |
|---|---|---|---|
| 4,334,306 | 6/1982 | Ulug | 370/94.3 |
| 4,914,650 | 4/1990 | Sriram | 370/94.1 |
| 5,231,633 | 7/1993 | Hluchyj et al. | 370/94.1 |
| 5,280,483 | 1/1994 | Kamoi et al. | 370/94.1 |
| 5,289,462 | 2/1994 | Ahmadi et al. | 370/94.1 |

OTHER PUBLICATIONS

G. R. Ash, B. M. Blake & S. D. Schwartz, "Integrated Network Routing and Design," Teletraffic Science for Cost Effective Systems, Networks and Services, Elsevier Science Publishers, 1989.

G. R. Ash, "Traffic Network Routing, Control and Design for the ISDN Era," Traffic Enginering for ISDN Design and Planning, Elsevier Science Publishers 1988.

Primary Examiner—Douglas W. Olms
Assistant Examiner—Shick Hom
Attorney, Agent, or Firm—Darleen J. Stockley

[57] ABSTRACT

A device and method allocate bandwidth on internodal links in a communiation network such that worst case maximum delays and worst case average delays in a packet oriented network are guaranteed while providing statistical gains in maintaining predetermined end-to-end delay QOS objectives for different traffic types.

9 Claims, 5 Drawing Sheets

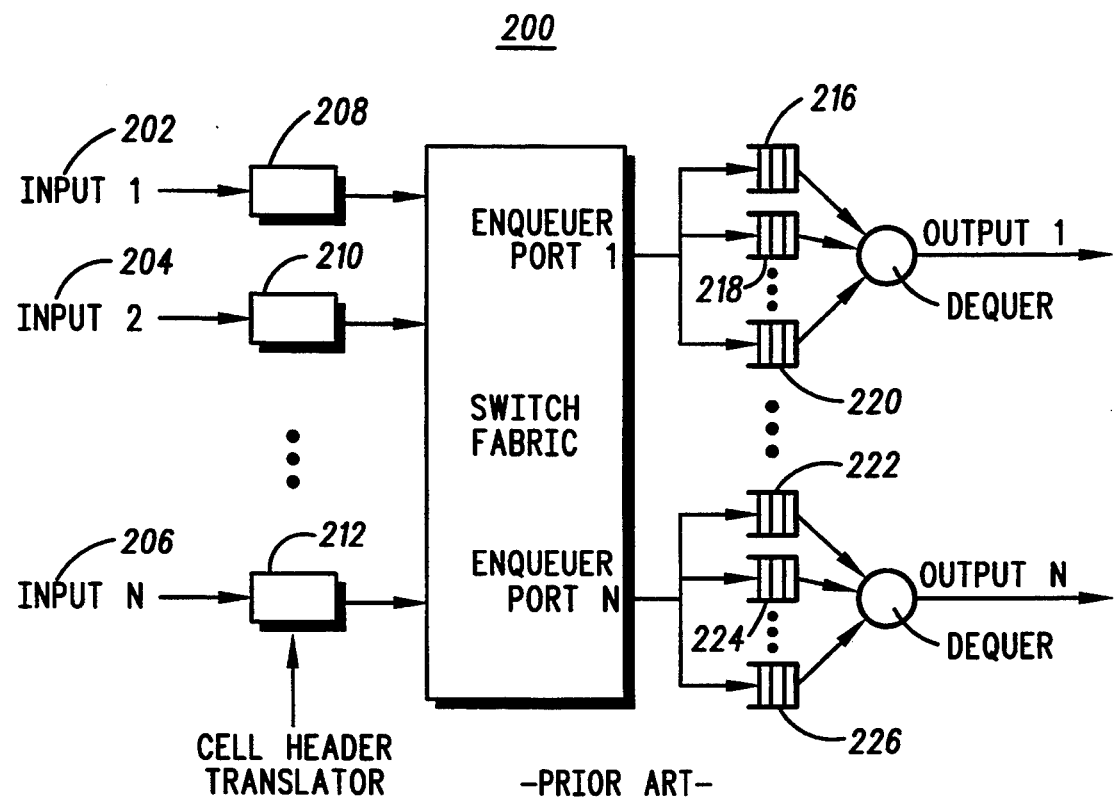
FIG.2 —PRIOR ART—
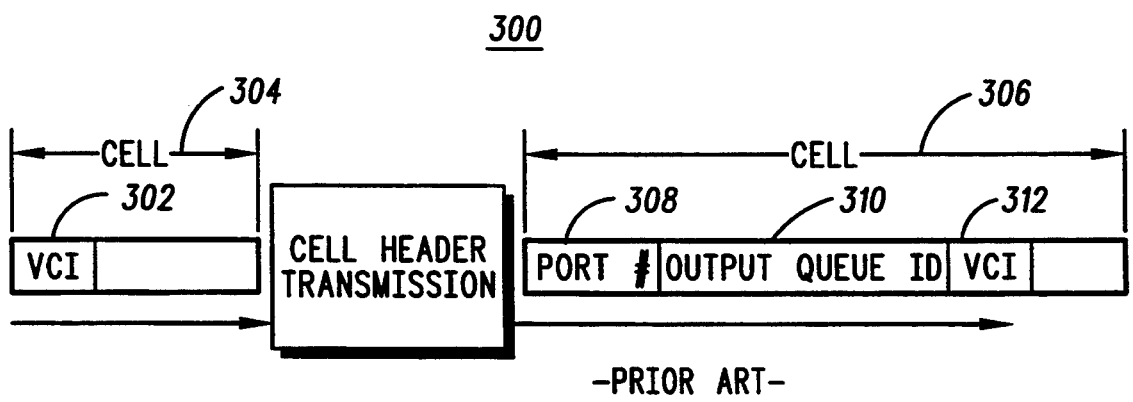
FIG.3 —PRIOR ART— a traffic class to enable a maximum blocking probability for connections from that traffic class.

Note that (1) and (2) oppose each other and therefore must be engineered in a balancing manner, as is done in the present invention. For example, allocating less bandwidth than the peak rate of sources can cause congestion in the network and therefore cause the delay QOS to degrade below acceptable limits. On the other hand, the simplest way of providing the required QOS is by allocating bandwidth generously, thus sacrificing statistical gains or efficiencies. This invention addresses the problem of meeting these objectives simultaneously.

FIG. 1, numeral 100, illustrates a communication network with nodes (102, 104, 106) and internodal links (INL) (108, 110, 112, 114) that is suitable for implementing the method of the present invention. Each node may serve a plurality of users (PBX, 116; Host, 118; LAN, 120; PSTN/ISDN (public switched telephone network-/integrated services digital network-which may include, for example: V.32, 122; BRI (basic rate interface), 124; DDS (dataphone digital service), 126), 130; Image, 128; Video, 132; LAN, 134; Net Mgr (network manger), 136). An ISDN (138) may be selected to form the internodal link. The network is connection oriented and offers QOS guarantees at connection setup time, and this QOS is guaranteed for the duration of the connection. Traffic from bursty sources is multiplexed statistically on internodal links in order to achieve high utilization of network resources. In such an environment, end-to-end delays for connections can vary depending on the instantaneous loading of the network. The invention provides a mechanism for allocating internodal link bandwidth in order to guarantee a worst case end-to-end delay for the connection, while providing statistical gains in the usage of internodal link bandwidth. Clearly, the number of nodes and internodal links may be varied.

Two types of traffic sources are considered. The first type consists of Real Time Sources or sources that require the maximum delay through the network to be constrained below a specified limit. The second type consists of Non-Real Time Sources or sources that require the average delay through the network to be constrained below a specified limit. Such sources may or may not require retransmission services from the network for errored frames. If retransmission is done within the network, the average delay can be scaled by the average number of retransmissions, and the method of this invention can then be applied.

FIG. 2, numeral 200, is a block diagram of a node in the communications network of FIG. 1 that includes a cell relay switch with output queueing. Cells are switched from an input port (202, 204, . . . 206) by translating (208, 210, . . . 212) the incoming Virtual Channel Identifier (VCI, 302) of the cell (302), used to identify the connection on the input side of a switch (SWITCH FABRIC, 214), to the outgoing Port Number (Port 1, . . . Port N), Output Queue (216, 218, . . . 220; 222, 224, . . . , 226) ID and the VCI associated with an output internodal link. This cell header translation is illustrated in FIG. 3, numeral 300. The VCI (312) is maintained for the cell (306), and the Port Number (308) and Output Queue ID (310) are used internal to the switch fabric to route each cell (306) to the proper output port and queue, and are stripped from the cell before it is transmitted on the output internodal link. Cells from one connection are multiplexed with cells from other con-

METHOD FOR ALLOCATING INTERNODAL LINK BANDWIDTH IN A PACKET ORIENTED COMMUNICATION NETWORK TO GUARANTEE DELAY QUALITY-OF-SERVICE

FIELD OF THE INVENTION

This invention is generally directed to bandwidth allocation in a packet oriented network and more particularly to allocating internodal link bandwidth in a packet oriented network for guaranteeing delay quality-of-service.

BACKGROUND

Cell relay technology is emerging as the method of choice for integrated communication networks. Such networks carry a wide variety of traffic types from different applications—data, voice, image and video being the often cited examples. Using a cell relay mechanism to packet switch different traffic types in the network provides a means for achieving integration of both transmission and switching resources while providing Quality-of-Service (QOS) guarantees.

Setting aside capacity on network links for reducing blocking probabilities for connections has been shown. Previous methods considered only connection blocking. However, there is a need for a method of allocating bandwidth on internodal links in the integrated communication network that at least provides statistical gains while maintaining end-to-end delay QOS objectives for different traffic types.

BRIEF DESCRIPTIONS OF THE DRAWINGS

FIG. 2 is a block diagram of a node in the communications network of FIG. 1 that includes a cell relay switch with output queueing.

FIG. 3 is a block diagram illustrating cell header translation in accordance with the present invention.

Figure 1:
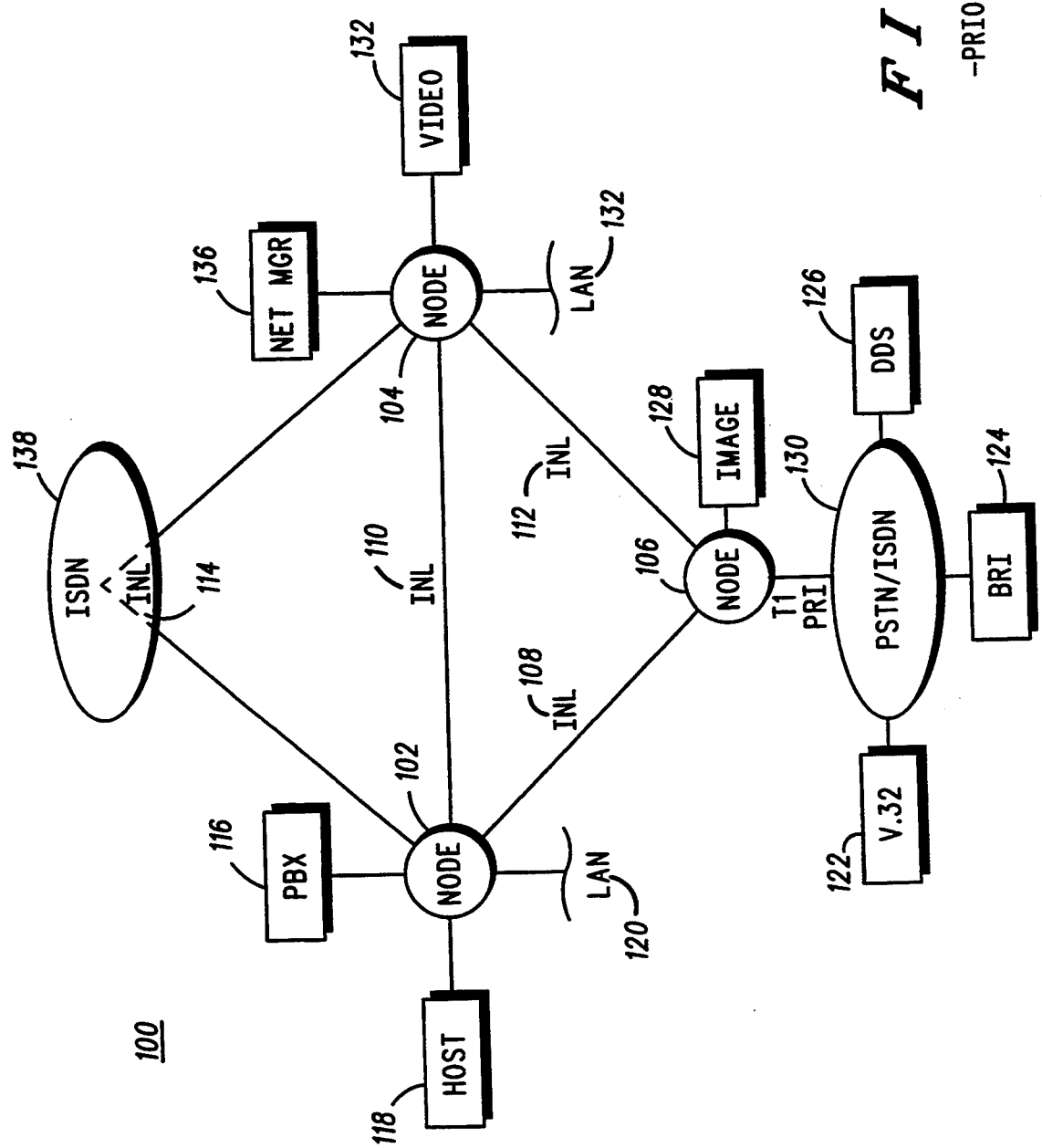
FIG. 1 illustrates a communication network with nodes and internodal links (INL) that is suitable for implementing the method of the present invention.
Figure 4:
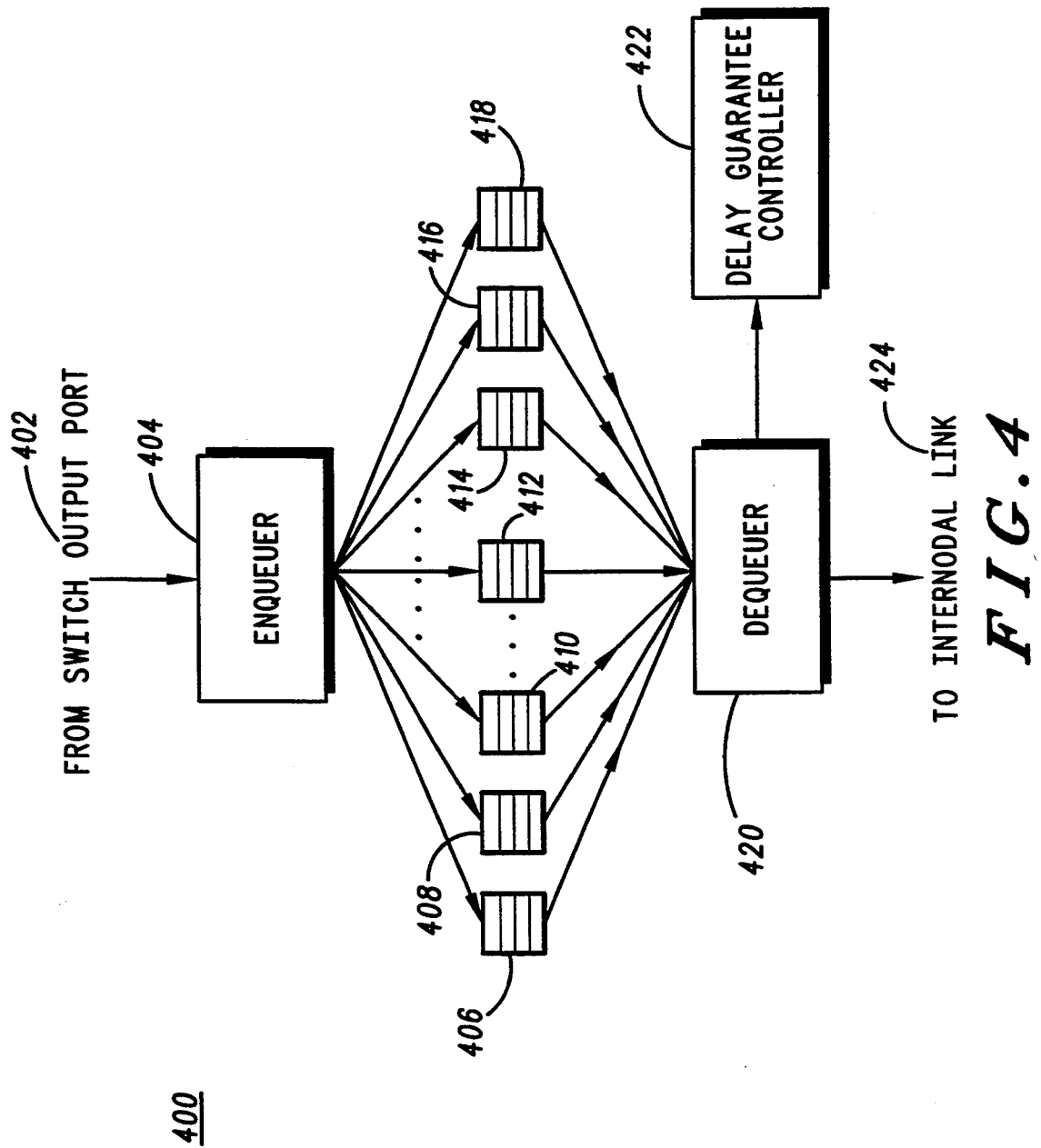

FIG. 4, numeral 400, illustrates a queueing mechanism at the output port of a cell relay switch in accordance with the present invention.

Figure 5:
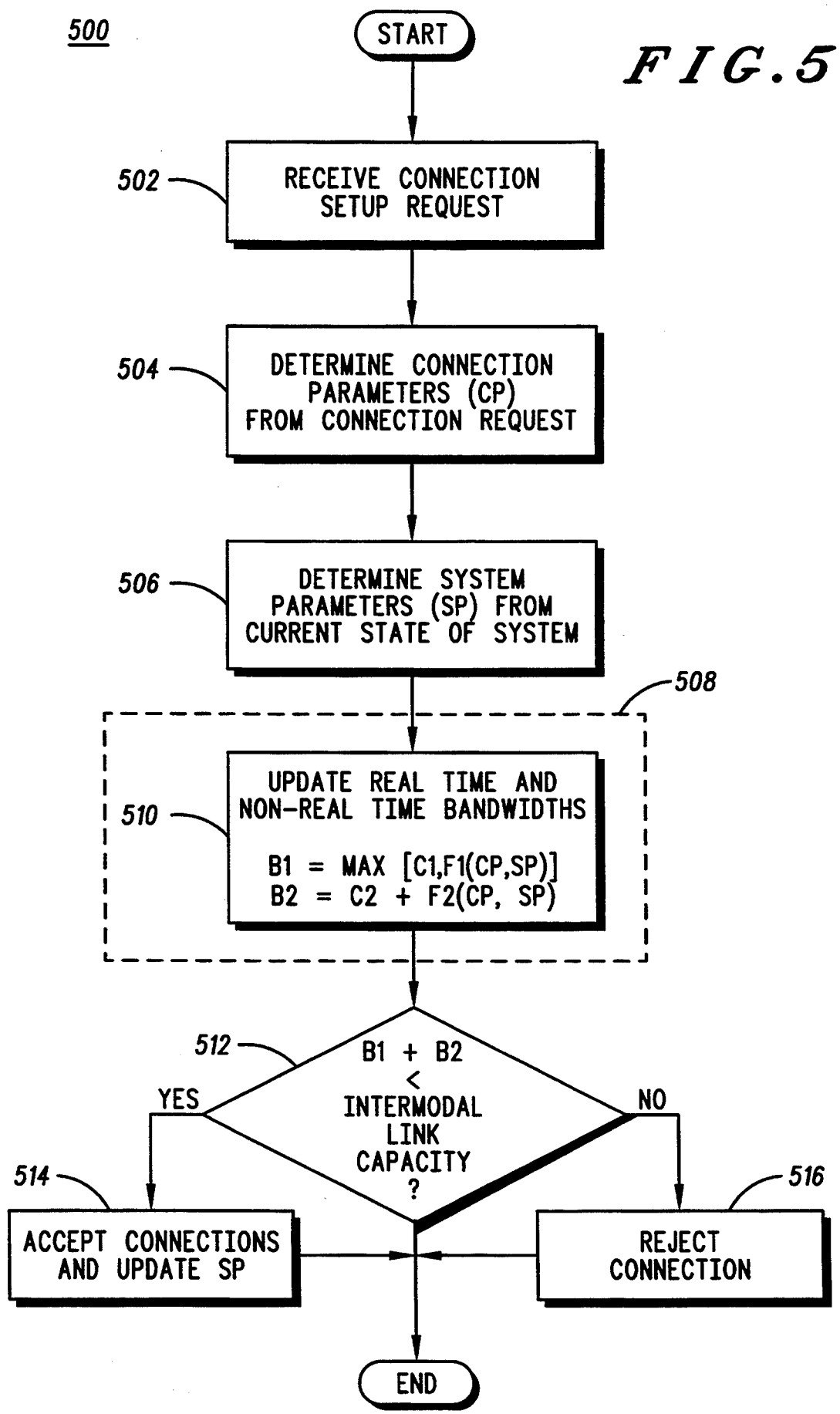

FIG. 5, numeral 500, is a flowchart showing one embodiment of steps of the method of the present invention for bandwidth allocation for connection setup on an internodal link.

Figure 6:
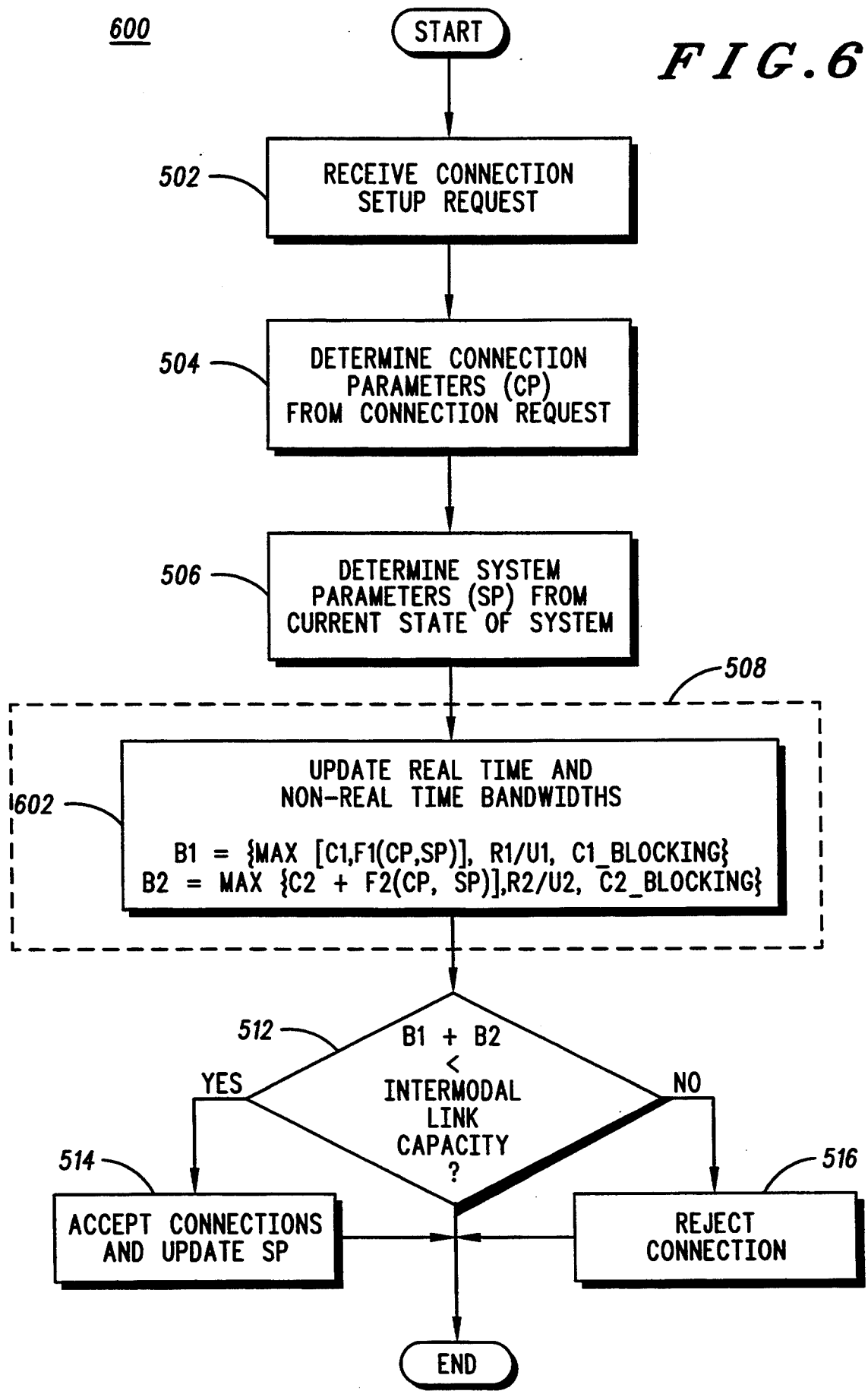

FIG. 6 is a flowchart showing the steps of a second embodiment of the method of the present invention for enhanced bandwidth allocation for connection setup on an internodal link.

DETAILED DESCRIPTION OF A PREFERRED EMBODIMENT

The cell relay networks utilized in this invention are connection oriented and QOS guarantees are provided on a per connection basis. This invention describes a method of allocating bandwidth on internodal links in the network for (1) achieving statistical gains by allocating less bandwidth than the sum of the peak rates of traffic sources multiplexed on that link, (2) maintaining the end-to-end delay QOS objectives for the different traffic types, (3) providing delay QOS guarantees at the time of setting up a connection and maintaining the guarantees over the life of the connection as the network utilization varies when other connections enter and leave the network, and (4) preserving at least a minimum bandwidth allocation on an internodal link for nections in the output queues prior to being transmitted on the internodal link.

FIG. 4, numeral 400, illustrates a queueing mechanism at the output port of a cell relay switch in accordance with the present invention. An Enqueuer (404) queues cells from the switch output port (402) into one of several queues (406, 408, 410, ..., 412, ..., 414, 416, 418) based on the traffic type of the cell. A Dequeuer (420) removes cells from the queues in a certain order and transmits them on the internodal link (424). U.S. Pat. No. 5,231,633 describes such a queueing system for multiplexing integrated traffic at the output of a cell relay switch. The order in which cells are selected for transmission from individual queues constitutes the service discipline for the queueing system and is controlled by the Delay Guarantee Controller (422). This controller (422) allocates bandwidth on the internodal link to each queue or a group of queues by determining the order and frequency with which a queue will be scanned for cells by the dequeuer using the method of the present invention.

The method of the present invention that is used by the Delay Guarantee Controller allocates bandwidth (frequency of scanning) such that statistical gains are maximized and delay QOS constraints are met. For a bursty source of traffic that emits bits at a peak rate of S bps, interspersed with periods for which the rate is lower than the peak, the average rate r describes the rate at which bits are emitted when the rate is averaged over a long interval. Statistical gains are achieved by allocating a bandwidth on the internodal link for the source, that is less than S but greater than r. Note that in a time division multiplexed system, the bandwidth allocated would be S, but in a statistically multiplexed cell relay system a smaller bandwidth can be assigned, thereby producing a "statistical gain."

The end-to-end delay for a connection consists of the sum of: a) a sum of propagation delays at each hop, b) a sum of switching delays at each hop, and c) a sum of the queueing delays and transmission delays (termed "system delay" for convenience) at each hop.

Note that a) and b) are fixed delays, do not vary as other connections enter and leave the network, and do not depend on the allocated bandwidth. The system delay components, however, do vary both due to fluctuations in the rates of bursty connections, as well as when other connections enter and leave the network. The end-to-end delay can be guaranteed, therefore, if c) can be guaranteed to be less than a given limit.

To limit the sum of the queueing delays, the invention utilizes a method of limiting the worst case system delay at each hop to less than an engineered value. Since this worst case system delay does not change at each hop, the end-to-end worst case delay can be guaranteed.

The method for limiting the worst case system delay at an internodal link used by this invention provides for allocating at least a minimum bandwidth $C_i$ to traffic class i connections routed on that link. For notational simplicity, i=1 represents the real time traffic and i=2 represents the non-real time traffic. The method for computing the bandwidth to be allocated (the invention assumes that each traffic class can be served at a rate that corresponds to the allocated bandwidth) is 1. Real Time Traffic: $B1 = \max[C1, F1(CP, SP)]$,
2. Non-Real Time Traffic: $B2 = C2 + F2(CP, SP)$, where F1(CP, SP) and F2(CP, SP) are predetermined functions of connection parameters (CP) and system parameters (SP). The system parameters and the predetermined functions F1(CP, SP) and F2(CP, SP) typically represent the existing connections on the internodal link, the statistics of the traffic, the queueing discipline used (if multiple queues are used within a traffic class—e.g. Head of Line Priority), etc., and may be chosen appropriately for specific implementations.

FIG. 5, numeral 500, is a flowchart showing one embodiment of steps of the method of the present invention for bandwidth allocation for connection setup on an internodal link. A more detailed explanation of the bandwidth allocation method is illustrated by the following examples:

1. Real Time Traffic: Worst Case Delay=max(System Delay)=max(Queue Size/B1) since the Queue Size is finite. The maximum of the right hand side of this equation occurs when B1 is minimum or when F1(CP, SP) is minimum. Note that this is true for any F1(CP, SP) and for the particular case of F1(CP, SP)=R1, where R1 is the sum of the average rates of all real time connections multiplexed on the internodal link. In this case, the minimum occurs for R1=0. Therefore, the Worst Case Delay=Queue Size/C1

2. Non-Real Time Traffic: For this traffic, the queueing performance (i.e., the system delay) depends on the frame or message size, where a frame consists of many cells that are submitted back to back to the system. Since average delays are being determined for such traffic, the system delay is the average system delay of a frame and the worst case system delay is therefore the worst case average system delay. Let the average frame size be denoted by L. Using a model of the M/M/1 queueing system type, System Delay=L/[F2(CP, SP)+C2−R2], where R2 is the sum of the average rates of all non-real time connections multiplexed on the internodal link. F2(CP, SP) is typically selected to be equal to K*R2, where K is a constant greater than or equal to 1. Worst Case Delay=L/C2, because K*R2−R2 is minimum when R2=0.

In addition to guaranteeing the system delay at a link, an extension to the basic invention may be selected to limit the utilizations (U1 and U2) of the real time and non-real time queues, respectively, to a maximum since large utilizations tend to make the queue unstable. Additional requirements to limit connection blocking to a predefined limit may require minimum bandwidths (C1_Blocking and C2_Blocking) to be set aside. In this environment, the method for allocating bandwidth becomes:

1. Real Time Traffic: $B1 = \max\{\max[C1, F1(CP, SP)], R1/U1, C1\_Blocking\}$
2. Non Real Time Traffic: $B2 = \max\{C2 + F2(CP, SP), R2/U2, C2\_Blocking\}$ The use of an enhanced bandwidth allocation method, a second embodiment of the method of the present invention, for connection setup on an internodal link is illustrated in the flowchart of FIG. 6, numeral 600.

The usage of minimum bandwidths C1 and C2 for real time and non-real time sources to control delays is novel, providing a method of guaranteeing maximum or worst case average delays in a packet oriented network.

Thus, the method for allocating bandwidth on internodal links in a communiation network for guaranteeing worst case maximum delays and worst case average delays in a packet oriented network system while providing statistical gains, includes the steps of: A) receiving a connection setup request (502), B) determining connection parameters (CP) from the 10 connection request (504), C) determining system parameters (SP) from a current state of the system (506), D) updating real time (B1) and non-real time (B2) bandwidths for guaranteeing worst case maximum delays and worst case average delays while providing statistical gains (508), E) determining whether a sum of B1+B2 is less than a predetermined internodal link capacity (512), and one of E1—E2: E1) where the sum B1+B2 is less than the predetermined internodal link capacity, accepting the connection and updating SP (514), and E2) where the sum B1+B2 is greater than or equal to the predetermined internodal link capacity, rejecting the connection (516).

For example, the real time and non-real time bandwidths may be selected such that one of A—B: A) the real time bandwidth, B1, equals a maximum of [C1,F1(CP,SP)] and the non-real time bandwidth, B2, equals C2 plus F2(CP,SP), where C1 represents a minimum bandwidth allocated to the real time traffic, C2 represents a minimum bandwidth allocated to the non-real time traffic, F1(CP, SP) and F2(CP, SP) are predetermined functions of connection parameters (CP) and system parameters (SP) (510), and B) the real time bandwidth, B1, equals a maximum of {C1,F1(CP,SP)], R1/U1, C1_Blocking} and the non-real time bandwidth, B2, equals max {C2 +F2(CP,SP)], R2/U2, C2_Blocking}, where C1 represents a minimum bandwidth allocated to the real time traffic, C2 represents a minimum bandwidth allocated to the non-real time traffic, F1(CP, SP) and F2(CP, SP) are predetermined functions of connection parameters (CP) and system parameters (SP), R1 is the sum of the average rates of all real time connections multiplexed on the internodal link, R2 is the sum of the average rates of all non-real time connections multiplexed on the internodal link, C1_Blocking and C2_Blocking represent preselected minimum bandwidths, and U1 and U2 represent maximum allowed utilizations of the real time and non-real time queues, respectively (602).

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A device for allocating bandwidth on an internodal link in a communication network for guaranteeing worst case maximum delays and worst case average delays in a packet oriented network while providing statistical gains, comprising:
   A) an enqueuer, operably coupled to receive packets from a switch output port, for enqueueing the packets in a queue,
   B) queues, operably coupled to the enqueuer, for storing the enqueued packets,
   C) a dequeuer, operably coupled to the queues and to a delay guarantee controller, for dequeuing the enqueued packets in accordance with a predetermined delay guarantee and transmitting cells from the packets on the internodal link, and
   D) the delay guarantee controller, operably coupled to the dequeuer, for providing predetermined worst case maximum delays and worst case average delays while providing statistical gains in maintaining predetermined end-to-end delay Quality of Service, QOS, objectives for different traffic types.

2. The device of claim 1 wherein the delay guarantee controller provides the predetermined worst case maximum delays and worst case average delays while providing statistical gains in maintaining predetermined end-to-end delay QOS objectives for different traffic types by utilizing a method comprising the steps of:
   2A) receiving a connection setup request,
   2B) determining connection parameters, CP, from the connection request,
   2C) determining system parameters, SP, from a current state of the system,
   2D) updating real time, B1, and non-real time, B2, bandwidths for guaranteeing delays while providing statistical gains,
   2E) determining whether a sum of real time and non-real time bandwidths, B1+B2, is less than a predetermined internodal link capacity, and one of:
      2E1) where the sum of the real time and non-real time bandwidths, B1+B2, is less than the predetermined internodal link capacity, accepting the connection and updating the system parameters, SP, and
      2E2) where the sum of the real time and non-real time bandwidths, B1+B2, is greater than or equal to the predetermined internodal link capacity, rejecting the connection.

3. The device of claim 2 where the real time and non-real time bandwidths are one of:
   3A) the real time bandwidth, B1, equals a maximum of [C1,F1(CP,SP)] and the non-real time bandwidth, B2, equals C2 plus F2(CP,SP), where C1 represents the minimum bandwidth allocated to the real time traffic, C2 represents the minimum bandwidth allocated to the non-real time traffic, F1(CP, SP) and F2(CP, SP) are predetermined functions of connection parameters (CP) and system parameters (SP), and
   3B) the real time bandwidth, B1, equals a maximum of {C1,F1(CP,SP)], R1/U1, C1_Blocking} and the non-real time bandwidth, B2, equals max {C2+F2(CP,SP)], R2/U2, C2_Blocking}, where C1 represents the minimum bandwidth allocated to the real time traffic, C2 represents the minimum bandwidth allocated to the non-real time traffic, F1(CP, SP) and F2(CP, SP) are predetermined functions of connection parameters (CP) and system parameters (SP), R1 is the sum of the average rates of all real time connections multiplexed on the internodal link, R2 is the sum of the average rates of all non-real time connections multiplexed on the internodal link, C1_Blocking and C2_Blocking represent preselected minimum bandwidths, and U1 and U2 represent maximum allowed utilizations of the real time and non-real time queues, respectively.

4. The device of claim 3 wherein the system parameters (SP) and the predetermined functions F1(CP, SP) and F2(CP, SP) represent at least one of:
   4A) the existing connections on the internodal link,
   4B) the statistics of the traffic,
   4C) the queueing discipline used (if multiple queues are used within a traffic class.

5. The device of claim 4 where F2(CP, SP) is equal to K*R2, where K is a constant greater than or equal to 1.

6. A method for allocating bandwidth on internodal links in an integrated communication network for guaranteeing worst case maximum delays and worst case average delays in a packet oriented network system while providing statistical gains, comprising the steps of:

6A) receiving a connection setup request, 6B) determining connection parameters, CP, from the connection request, 6C) determining system parameters, SP, from a current state of the system, 6D) updating real time, B1, and non-real time, B2, bandwidths for guaranteeing worst case maximum delays and worst case average delays while providing statistical gains, 6E) determining whether a sum of real time and non-real time bandwidths, B1+B2, is less than a predetermined internodal link capacity, and one of:

6E1) where the sum of the real time and non-real time bandwidths, B1+B2, is less than the predetermined internodal link capacity, accepting the connection and updating the system parameters, SP, and 6E2) where the sum of the real time and non-real time bandwidths, B1+B2, is greater than or equal to the predetermined internodal link capacity, rejecting the connection.

7. The method of claim 6 where the real time and non-real time bandwidths are one of:

7A) the real time bandwidth, B1, equals a maximum of [C1,F1(CP,SP)] and the non-real time bandwidth, B2, equals C2 plus F2(CP,SP), where C1 represents the minimum bandwidth allocated to the real time traffic, C2 represents the minimum bandwidth allocated to the non-real time traffic, F1(CP, SP) and F2(CP, SP) are predetermined functions of connection parameters (CP) and system parameters (SP), and 7B) the real time bandwidth, B1, equals a maximum of {C1,F1(CP,SP)], R1/U1, C1_Blocking} and the non-real time bandwidth, B2, equals max {C2+F2(CP,SP)], R2/U2, C2_Blocking}, where C1 represents the minimum bandwidth allocated to the real time traffic, C2 represents the minimum bandwidth allocated to the non-real time traffic, F1(CP, SP) and F2(CP, SP) are predetermined functions of connection parameters (CP) and system parameters (SP), R1 is the sum of the average rates of all real time connections multiplexed on the internodal link, R2 is the sum of the average rates of all non-real time connections multiplexed on the internodal link, C1_Blocking and C2_Blocking represent preselected minimum bandwidths, and U1 and U2 represent the maximum allowed utilizations of the real time and non-real time queues, respectively.

8. The method of claim 7 wherein the system parameters (SP) and the predetermined functions F1(CP, SP) and F2(CP, SP) represent at least one of:

8A) the existing connections on the internodal link, 8B) the statistics of the traffic, 8C) the queueing discipline used (if multiple queues are used within a traffic class.

9. The method of claim 8 where F2(CP, SP) is equal to $K*R2$, where K is a constant greater than or equal to 1.

* * * * *